United States Patent
Audibert et al.

(10) Patent No.: US 6,740,625 B1
(45) Date of Patent: May 25, 2004

(54) METHOD AND FLUID FOR CHECKING THE SATURATION OF A FORMATION IN THE IMMEDIATE VICINITY OF A WELL

(75) Inventors: Annie Audibert, Croissy sur Seine (FR); Jean-François Argillier, Saint Cloud (FR); Daniel Longeron, Sartrouville (FR); Carine Dewattines, Wolvertem (BE); Michel Janssen, Marcinelle (BE)

(73) Assignees: Institut Francais du Petrole, Rueil-Malmaison cedex (FR); Oleon NV, Ertvelde (BE)

( * ) Notice: Subject to any disclaimer, the term of this patent is extended or adjusted under 35 U.S.C. 154(b) by 20 days.

(21) Appl. No.: 09/628,423

(22) Filed: Jul. 28, 2000

(30) Foreign Application Priority Data

Jul. 5, 2000 (FR) .............................................. 00 08707

(51) Int. Cl.⁷ ................................................. C09K 7/02
(52) U.S. Cl. ...................... 507/138; 507/139; 507/260; 507/265; 507/267; 507/136; 507/261
(58) Field of Search ................................ 507/136, 138, 507/139, 260, 261, 265, 267, 116

(56) References Cited

U.S. PATENT DOCUMENTS

| | | | | |
|---|---|---|---|---|
| 2,271,696 A | * | 2/1942 | Jones | 507/138 |
| 3,047,493 A | * | 7/1962 | Rosenberg | 507/138 |
| 3,379,708 A | * | 4/1968 | Peacock | 507/138 |
| 4,409,108 A | * | 10/1983 | Carney et al. | 507/138 |
| 4,802,998 A | * | 2/1989 | Mueller et al. | 507/138 |
| 5,441,927 A | * | 8/1995 | Mueller et al. | 507/138 |
| 5,707,940 A | * | 1/1998 | Bush et al. | 507/138 |
| 5,807,811 A | * | 9/1998 | Malchow, Jr. | 507/138 |
| 6,180,572 B1 | * | 1/2001 | Mueller et al. | 507/261 |

FOREIGN PATENT DOCUMENTS

GB  2283036 A  *  4/1995

* cited by examiner

Primary Examiner—Philip C. Tucker
(74) Attorney, Agent, or Firm—Antonelli, Terry, Stout & Kraus, LLP

(57) ABSTRACT

The present invention relates to a method and a fluid for drilling or intervening in a well passing through a porous, permeable formation, wherein a water-based well fluid is circulating in said well. In this method, there is added to the fluid not only the conventional ingredients for such a fluid but also a maximum of 10 wt. % of a composition obtained from a grease or oil and an alcohol, with the chain lengths of the acid and alcohol parts being chosen such that the ester thus obtained has sufficient dispersion in water, compatibility with said ingredients, does not form an emulsion with the reservoir oil, and adsorbs sufficiently on the porous formation.

7 Claims, 1 Drawing Sheet

METHOD AND FLUID FOR CHECKING THE SATURATION OF A FORMATION IN THE IMMEDIATE VICINITY OF A WELL

The present invention relates to the field of drilling, or more generally the field of operations requiring circulation of a fluid in a drilled well, said fluid being in contact with the porous, permeable rock walls. During these operations, the circulating fluid penetrates into the thickness of the wall to a greater or lesser degree depending on the effectiveness of the filtrate-reducing additives that can be added to the fluid. It is known that the "filtrate" (volume of fluid penetrating into the rock) can cause the well wall to clog to varying degrees. If the well passes through a hydrocarbon-producing area, productivity can be seriously impaired. The present invention proposes a fluid and a method for drilling a well, or intervening in a drainhole intended for starting production in a hydrocarbon-producing formation while favoring the flow of these hydrocarbons to the well.

The fluid used when drilling a well circulates at right angles to the formation whose pressure is higher than the pressure of the formation. This enables inflow phenomena to be limited and the stability of the well walls to be controlled. Filtration phenomena occur, forming a filtration cake. Depending on the circulation conditions (whether or not mud is circulating in the well), an external and internal cake, or just an internal cake, is formed in the so-called "spurt" period. This very-low-permeability cake protects the formation, and in particular the reservoir rock, from invasion by the constituents of the drilling mud. However, recent studies (A. Audibert, J-F Argillier, H. Ladva, Way P., Hove A. "Role of Polymers in Formation Damage" SPE 54767 presented to the SPE Formation Damage, The Hague, 1999) show that a zone is formed, beyond the internal cake, invaded by certain mud components. In particular, in the case of an oil reservoir drilled with water-containing mud, the reservoir is seen to be invaded beyond the internal cake by a fraction of the polymers contained in the mud. These hydrophilic polymers are not held back in the cake and become adsorbed in the pores of the rock, thus reducing the permeability of the rock to oil. This phenomenon is more significant in the vicinity of the well, and causes water saturation to increase near the well.

The invention applies advantageously to water-containing mud formulations proposed for crossing reservoirs, more generally known as "drill-in fluids" (described for example in the document "Drill-in Fluids Control Formation Damage" by Halliday W. S., World Oil, December 1994,43–47).

The well fluids are complex fluids whose main functions are to participate in cleaning the well during drilling or after it has been drilled (completion fluids), apply a sufficient hydraulic pressure to ensure the safety of the well, stabilize the well walls, lubricate the casing strings or strings of rods, or enable equipment to be set up at the bottom or the production process to be implemented (completion fluids). To bring about these functions, the basic fluid, water in this case, has specific products added to it to regulate the rheology, density, cleaning ability, and filtrate control, for example. No well fluid additive that has a direct effect on the saturation of the rock in contact with the fluid is known.

Thus, the present invention relates to a drilling or intervention method in which fluid is made to circulate in a well drilled into a hydrocarbon reservoir rock. The fluid is water-based and includes all the additives required for the functions of a drilling fluid and/or interventions, and a sufficient quantity, 10 wt. % as a maximum, preferably less than 5%, of an ester-based additive composition obtained by glycerolysis, by direct esterification, or by transesterification from a grease (or an oil) and an alcohol.

Such additives are classically used in secondary or tertiary recovery when the reservoir is flushed. These recovery phases take place when a reservoir is produced after the primary recovery phases. These additives are added to a polymer solution or as a preflush to reduce the water-oil interfacial tension and improve eventual recovery of oil by flushing. Surprisingly, the use of such additives in drilling fluids and/or interventions reduces and prevents damage to the reservoir during the drilling and/or intervention phases in wells drilled in hydrocarbon reservoir rocks. Of course, the nature of these additives is determined based on the particular nature of the water-based well fluids that contain other additives with which the additive according to the invention must be compatible, i.e. not impede the functions of other additives or components of the well fluid.

The ester of the present invention is obtained by glycerolysis, by direct esterification, or by transesterification from a grease (or an oil) and an alcohol. All vegetable or animal greases may be suitable if their chain length is between C6 and C22, preferably between C6 and C12.

The grease (or oil) must also include triglycerides, fatty acids, and methyl esters. The entire castor oil equivalent range must also be included.

The alcohols of the present invention include diols, triols, polyols, and mixed polyalkoxides.

The following may be cited in particular:

glycerol: $HOCH_2-CHOH-CH_2OH$;

polyglycerol $$HOCH_2-CHOH-CH_2-(OCH_2-CHOH-CH_2)_n-OCH_2-CHOH-CH_2OH$$

where n is between 1 and 8, preferably between 1 and 4;

ethylene glycol; $HOCH_2CH_2OH$;

polyethylene glycol: $H(OCH_2CH_2)_nOH$, where n is between 2 and 30, preferably between 2 and 12, propylene glycol: $CH_3-CHOH-CH_2OH$;

polypropylene glycol: $H(OCH)CH_3)CH_2)_nOH$, where n is between 2 and 30, preferably between 2 and 12, polyethylene glycol-polypropylene glycol mixtures.

The additive composition according to the invention combines the various properties required for its maximum effectiveness, particularly with regard to the change in wettability of the rock.

In other words, the additive composition has the following features:

good dispersion in water of the well fluid, i.e. sufficient water solubility, even if not total solubility, very good compatibility with the water-based fluid, i.e. does not interfere with the properties required for the mud, provided by other compounds or additives, passes directly into the filtrate, i.e. is not held back or blocked in the cake that may form on the well wall, does not form an emulsion with the reservoir oil, and adsorbs sufficiently on the rock.

The additive according to the invention can be used in a concentrated form (for example approximately 1 g/l) or diluted in a solvent oil (a vegetable or animal oil described above).

The present invention will be better understood and its advantages will emerge more clearly from reading the following description of nonlimiting examples, illustrated by the attached figures.

The polyglycerol we used in the examples below has the following composition:

glycerol: ±27% (between 24 and 30%)
diglycerol: ±31% (between 28 and 34%)
triglycerol: ±23% (between 20 and 26%)
tetraglycerol: ±12% (between 9 and 15%)
pentaglycerol: ±7% (between 4 and 10%)

namely its degree of polymerization is between 2 and 3, preferably ±2.5.

It is then esterified with a mole/mole stoichiometry with a C8–C10 fatty acid to arrive at a mono-C8–C10 polyglycerol majority distribution called PG 8/10 below. "C8–C10 fatty acid" is understood to be an industrial acid consisting essentially of C8 or C10 acids, but possibly also containing small quantities of heavier or lighter acids, resulting from the manufacturing process.

Tests in Porous Medium:

The tests or experiments in a porous medium have the purpose of simulating passage of the filtrate through a reservoir rock and studying its interaction with the material with which the rock is already saturated. Two types of experiment are conducted:

(i) simulation of passage of a reconstituted filtrate through the rock;

(ii) simulation of complete filtration of a water-based mud through a rock.

In both cases, the residual water saturation of the rock is observed to change, as is the permeability to oil in the direction opposite the filtration direction (backflow).

Figure 1:
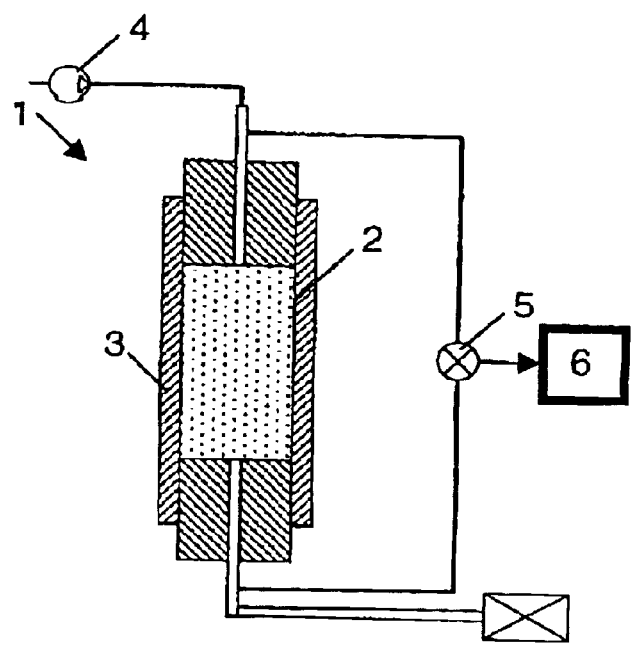
FIG. 1 shows the testing means on a sample of porous rock.

The experimental device is shown schematically in FIG. 1.

The porous medium is placed in a Hassler cell 1. A confining pressure of 2 MPa is applied to the medium with the aid of a squeeze cap 3. Brine, oil or a simulated filtrate can be circulated in the porous medium. The flowrate of the injected solution is controlled by a Pharmacia type piston pump 4. A differential pressure sensor 5 is placed between the inlet and the outlet of the cell. The device is connected to a computer 6 which for example calculates the permeability of the rock to the injected liquid.

Core sample 2 is made of Clashach sandstone for experiments (i) or Vosges sandstone for experiments (ii). It has the following dimensions: length 60 mm, section 32.7 mm, pore volume Vp approximately 8.5 cm$^3$, porosity approximately 17%.

The method of operation is as follows:

(i) Simulation of Passage of a Reconstituted Filtrate Through the Rock

Three steps are necessary:
1) Setting Up Initial Conditions:

The porous medium must be under conditions similar to those of the reservoir. Hence the core sample must be saturated first with brine then with oil:

(a) Saturating rock with brine: the core sample is saturated in a vacuum drier, then subjected to a confining pressure of 2 MPa and permeated with brine (40 g/L NaCl, 5 g/L KCl) at 10 cm$^3$/h for 48 hours with 10 bars pore pressure.

(b) Measuring permeability to brine: the core sample is permeated with brine at different flowrates (Q: 300, 200, 100 cm$^3$/h) and the pressure difference ($\Delta P$) between the ends of the porous medium is measured. Measurement of the straight curve $Q=f(\Delta P)$ enables the permeability of the rock to brine Kw (in milli-Darcy) to be calculated.

(c) Measuring permeability to oil: inject Soltrol 130 oil (refined oil with viscosity 0.7 mPa.s at 80° C.) at 10 cm$^3$/h for 24 hours, then gradually increase flowrate from 100 cm$^3$/h to 500 cm$^3$/h. The volume of water collected enables the saturation rate of the oil (So) and water (Sw) to be calculated.

The core sample is then permeated with oil at different flowrates (300, 200, 100 cm$^3$/h) and the differential pressure $\Delta P$ is measured. The slope of curve $Q=f(\Delta P)$ enables the permeability of the rock to oil Ko (in milli-Darcy) to be calculated.

2) Invasion by Filtrate

The solution simulating the filtrate (brine or brine+additive or brine+polymers or brine+polymers+additive) is injected at 10 cm$^3$/h. The volume of oil collected enables the new water and oil saturation rates to the calculated.

3) Simulation of Well Production Phase

Initial well production is simulated by backflow injection of oil (i.e. in the opposite direction to injection of the filtrate) at 10 cm$^3$/h. The volume of water collected enables the new water and oil saturation rates Sw and So to be calculated. The core sample is then permeated by oil at various flowrates (300, 200, 100 cm$^3$/h) and the differential pressure $\Delta P$ is measured. The slope of curve $Q=f(\Delta P)$ enables the permeability of the rock to oil $Ko_1$ (in mD) to be calculated.

(ii) Filtration of Water-Based Mud Through the Rock

1. Setting up Initial Conditions: Proceed as Before
2. Dynamic Filtration (600 s-1) at Elevated Pressure (3.5 MPa) and Temperature:

Once saturated under the conditions of a reservoir, the core sample is placed in a dynamic filtration cell. A water-based mud is then filtered, upon which an external and internal cake forms. This experiment is closer to actual conditions because the core sample is traversed by an actual water-based mud filtrate, not a simulated filtrate.

3. Well Production Conditions:

The core sample is then transferred to the Hassler cell and the water and oil saturations and the return permeability to oil are measured as before by backflow injection of oil.

EXAMPLE 1

Changing Saturations (Brine and Brine Plus Additive)

The tests consist of injecting a brine, to which the additive according to the invention is or is not added, into a porous medium previously saturated with oil and water under Swi (initial water saturation) conditions (type (i) test.

The results are given in the table below:

|  | Sw (%) | Ko (mD) |
|---|---|---|
| Saturation with brine | 100 |  |
| Injection of oil | 18.1 | 775 (initial conditions) |

-continued

|                                      | Sw (%) | Ko (mD) |
|---|---|---|
| After injection of filtrate (soaking) | 55.5   |         |
| After backflow with Soltrol oil       | 15.8   | 850     | where:

Sw is the saturation with water (percentage water contained in pore volume)

Ko is the permeability of the core sample to oil expressed in milli-Darcy (in IS units, the conversion factor is: 1 Darcy=$9.87.10^{-13}$ m$^2$).

When there is 0.1 g/l of PG8/10 additive in the brine, the results become:

|                                      | Sw (%) | Ko (mD)                  |
|---|---|---|
| Saturation with brine                | 100    |                          |
| Injection of oil                     | 16     | 630 (initial conditions) |
| After injection of filtrate (soaking)| 36.7   |                          |
| After backflow with Soltrol oil      | 0      | 763                      |

These filtration tests show that addition of 0.1 g/l of PG8/10 additive removes most of the residual water. Addition of the additive to a brine injected into a porous medium thus enables the saturation to be changed by displacing residual water, hence in the direction of higher oil saturation. Note that permeability to oil also increases after backflow.

EXAMPLE 2

Change in Saturation (Brine Containing Polymer in Addition)

The same experiments are conducted in the presence of 0.5 g/l of a polymer (polyacrylamide, PAM) to approximate the actual composition of a water-based mud filtrate. With PAM alone there is no change in residual water saturation. However, the oil permeability is decreased due to adsorption of the polymer on the rock and clogging of its pores by the polymer aggregates. As can be seen from the example below, when PG8/10 is added, most of the residual water is displaced. Note also that the decrease in the oil permeability of the rock is less than when PAM alone is present.

|                                      | Sw (%) | Ko (mD)                          |
|---|---|---|
| Saturation with brine                | 100    |                                  |
| Injection of oil                     | 17.5   | 810 (initial conditions)         |
| After injection of filtrate (soaking)| 50.4   | (+0.5 g/l PAM)                   |
| After backflow with Soltrol oil      | 15     | 693                              |

With the addition of 0.1 g/l PG8/10 to the brine, the results become:

|                                      | Sw (%) | Ko (mD)                  |
|---|---|---|
| Saturation with brine                | 100    |                          |
| Injection of oil                     | 15     | 738 (initial conditions) |
| After injection of filtrate (soaking)| 40.6   |                          |
| After backflow with Soltrol oil      | 1      | 680                      |

One may conclude that even when polymers are present the addition of PG8/10 removes most of the residual water and limits the reduction in oil permeability.

EXAMPLE 3

Change in Saturation (Complete Formulation)

To come closer to actual conditions, dynamic filtration is done then reinstitution of well production is simulated (type (ii) test). The water-based mud formulation is called Flopro, from the MI Company (USA) with the following conditions:

| Flovis        | 6 g/l     | (xanthan-viscosifier)    |
|---|---|---|
| Flotrol       | 7 g/l     | (starch-reduces filtrate)|
| Hy-Mod Prima  | 28.5 g/l  | (clay additive)          |
| NaCl          | 20 g/l    |                          |
| KCl           | 20 g/l    |                          |
| Idcarb 75     | 360 g/l   | (carbonate)              |
| PH = 8        |           |                          |

The results are the following:

|                                      | Sw (%) | Ko (mD)                   |
|---|---|---|
| Saturation with brine                | 100    |                           |
| Injection of oil                     | 36.8   | 1047 (initial conditions) |
| After injection of filtrate (soaking)| 73     | (Flopro)                  |
| After backflow with Soltrol oil      | 53     | 645                       |

With the addition of 0.1 g/l PG8/10 to the brine, the results become:

|                                      | Sw (%) | Ko (mD)                   |
|---|---|---|
| Saturation with brine                | 100    |                           |
| Injection of oil                     | 32.6   | 1283 (initial conditions) |
| After injection of filtrate (soaking)| 57     | (Flopro)                  |
| After backflow with Soltrol oil      | 28.6   | 845                       |

These tests, carried out on a complete formulation, confirm the good results obtained with saturation (saturation with residual water after oil backflow of 29% in the presence of 1 g/l PG8/10 is obtained, as opposed to 53% without additive).

EXAMPLE 4

Spreading a Drop

The goal is to show the effect of the additive on the wettability of the rock. For this purpose, spreading of a drop of oil on the surface of a rock (Clashach sandstone) immersed in a saline solution that contains or does not contain the additive according to the invention is observed.

The experimental setup (FIG. 2) is a crystallizer 10 containing an aqueous solution 11 (40 g/l NaCl 5 g/l KCl), a rock support 23, a slice of rock 13, and a drop of oil 14 (Soltrol) applied with a syringe 15.

The method of operation is as follows: a slice of Clashach sandstone rock is suspended in a saline solution that in one case contains and in the other, does not contain the additive. After immersion for about 40 seconds, a drop of Soltrol oil stained with Sudan blue is introduced at the surface of the rock with a needle. A drop is observed to form whether or not the additive according to the invention is contained in the solution.

Figure 2:
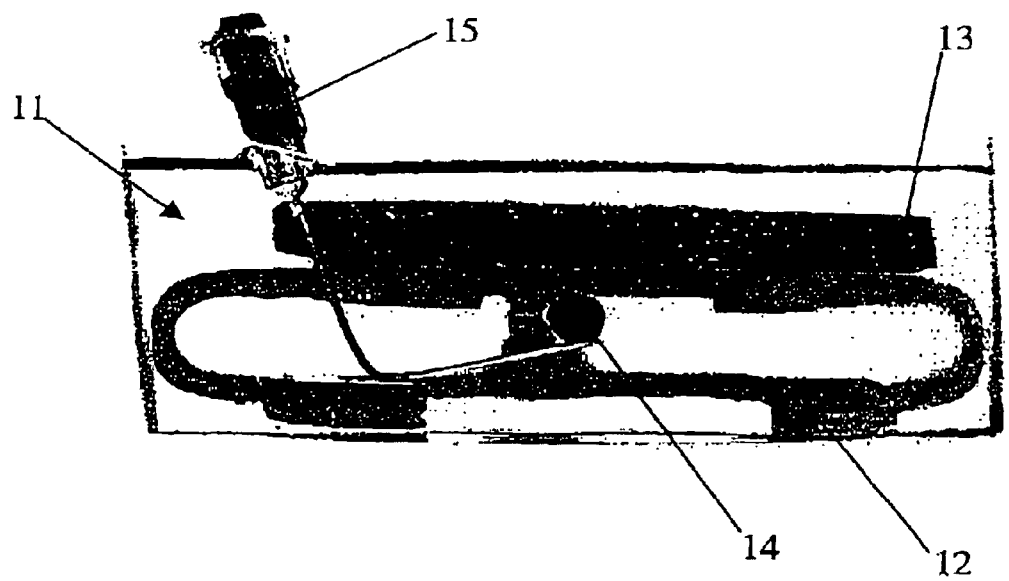
FIG. 2 is a cross section through the device for imaging the spreading of a drop.

In saline solution alone, the oil drop is round and does not spread (FIG. 2). The rock is thus preferentially wettable with water. Beginning at a concentration of 0.3 g/l PG8/10 in the brine, the oil drop is observed to spread on the rock and even penetrate into it at 2 g/l of active product. These tests, not illustrated here, confirm that PG8/10 increases the wettability of the rock with oil.

The surface tension (brine/air) and interfacial tension (brine/Soltrol) were measured at 25° C. The brine used contains 40 g/l NaCl and 5 g/l KCl. With no additive, the brine/water surface tension is 72 mN/m. With 100 ppm of additive, it drops to 25 mN/m. Without additive, the brine/Soltrol interfacial tension is 38 mN/m. With 10 ppm of additive it drops to 19 mN/m reaching 14 mN/m with 15 ppm of additive. The results show that PG8/10 has a definite interfacial activity because it can reduce the surface tension of water to 25 mN/m and the brine/Soltrol interfacial tension to 14 mN/m for low concentrations, less than the CMC (critical micellar concentration) of PG8/10 which is approximately 100 ppm.

EXAMPLE 5

Test on Long Core Sample

The effectiveness of the present invention is shown by a reservoir damage simulation test conducted on rock samples 40 cm long. The details of the experiment can be found in the article entitled "Performance Evaluation and Formation Damage Potential of New Water Based Drilling Formulations," Argilhier J-F, Audibert A., Longeron D. SPE Drilling and Completion, 14, No. 4, 266–273, 1999. The rock used is Clashach sandstone with the following composition: 94.7% quartz, 2.6% potassium feldspar, 0.5% chlorite, and 0.7% illite (including mica). The conditions to which the sample is subjected are known as irreducible water saturation (Swi) by evacuation, saturation with brine, then injection with Soltrol oil 130 (approximately 10 pore volumes). The oil permeability of the sample is then measured (Ko at Swi). The rock sample is made to contact drilling and/or intervention fluid circulating at right angles to the front face of the sample under the following conditions: pressure 0.35 to 2 MPa in steps of 0.5 MPa every 2 minutes, then stabilization at 2 MPa where the mud is moving at a rate of 5 l/min. When filtering is performed, the oil is produced at the end of the sample, corresponding to invasion of the core sample by the mud filtrate. The test is stopped at the filtrate breakthrough, i.e. when the first drop of filtrate comes out at the end of the core sample.

The mud used here is a formulation sold by MI Drilling Fluids (USA) and contains: 6 g/l Flovis (xanthan), 7 g/l Flotrol (starch), 20 g/l NaCl 20 g/l KCl, and 360 g/l calcium carbonate (Test 1) to which 0.1 g/l PG8/10 may be added (Test 2). The results of these two tests are provided below for comparison:

|  | Test 1 | Test 2 |
|---|---|---|
| Porosity (φ %) | 16.3 | 16.1 |
| Permeability to gas, kg (mD) | 685 | 546 |
| Permeability to water, Kw (mD) | 533 | 416 |
| Permeability to oil at Swi, Koi (mD) | 452 | 281 |
| Permeability to oil after backflow, Koi (mD) | 176 | 206 |
| % return permeability RP | 39 | 73 |
| Sw after backflow (%) | 27.8 | 29.5 |

We observe a significant difference in return permeability (after backflow) when PG8/10 is added to the mud, particularly in the first few centimeters of the core sample. This indicates that with backflow the porous medium once more becomes more easily saturated with oil in the case of mud with the presence of additive. Thus, the additive entrained with the filtrate preferentially blocks the adsorption sites, thus limiting adsorption/retention of polymers contained in the mud and hence entrained with the filtrate into the porous medium. This limits blocking or shrinking of the pores with polymers, improving permeability to oil.

EXAMPLE 6

Passage of Additive Through Cake

Since the additive is added to the drilling fluid or to the well fluid, it is essential for it to be able to penetrate into the permeable rock formation. In the case of a drilling fluid, it is essential for the substance to be able to pass through the cake into the filtrate. For this reason, passage of the substance through the cake was studied. The tests presented below were conducted on Green Bond muds (70 g/l Green Bond—bentonite sold by the SBF company; 1 g/l of PACLV, 1 g/l NaCl), and Flopro (Example 3).

First, the muds are centrifuged with and without PG8/10 to find out the adsorption of PG8/10 and polymers on the clay. Also, the muds are filtered for 30 minutes at 0.7 MPa and room temperature. AU the solutions obtained are analyzed in the COT to establish a materials balance in ppm of carbon. To find out the correspondence with the ppm's of the substance and of carbon, the PG8/10 calibration curve was obtained.

For the Green Bond mud, the results show that 35% of the GP8/0 adsorbs on clay and of the remaining 65%, 84% passes through the cake.

For Flopro mud, the material balance is more complex because of the presence of the polymers that contribute to the carbon measured in the filtrate. Even so, when PG8/10 is used, there is a sharp increase in carbon in the filtrate, due largely to the presence of PG8/10 in the filtrate.

These tests show that some of the PG8/10 molecules pass through the cake and are thus available for modifying the saturation in the oil formation.

EXAMPLE 7

Compatibility With Ingredients of a Drilling Mud

The compatibility of the product with the various ingredients of a mud was tested. For this purpose, the properties of the mud containing the additive were studied in terms of rheology and filtration. The results of this study on the Green Bond and Flopro muds with and without PG8/10, before and after aging, are summarized in the table below:

|  |  | Before | | After | | Before | | After | |
| --- | --- | --- | --- | --- | --- | --- | --- | --- | --- |
|  |  | without PG8/10 | with PG8/10 | without PG8/10 | with PG8/10 | without PG8/10 | with PG8/10 | without PG8/10 | With PG8/10 |
|  |  | GREEN BOND MUD | | | | FLOPRO MUD | | | |
| Viscosity study | AV | 36 | 38 | 33 | 34 | 9 | 7 | 16 | 15 |
|  | PV | 16 | 13 | 14 | 15 | 6 | 66 | 12 | 11 |
|  | YV | 40 | 42 | 38 | 38 | 6 | 2 | 8 | 8 |
|  | Gel 0\10 | 24\26 | 21\27 | 22\24 | 20\24 | 5\10 | —\— | 12\6 | 5\— |
| Filtration | Vfiltered 30 min | 8 ml | 8 ml | 7 ml | 7 ml | 14 ml | 14 ml | 14 ml | 14 ml |

AV: apparent viscosity in centipoise;
PV: plastic viscosity in centipoise (1 centipoise = 0.001 Pa · s)
YV: yield value in lb/100 ft$^2$.

Addition of 1 g/l pg8/10 does not significantly affect the filtration or rheology properties of the muds tested, showing that such an additive, as defined in the present invention, is compatible with the conventional ingredients of drilling fluids and/or intervention fluids.

What is claimed is:

1. A method for drilling or intervening in a well passing through a porous, permeable formation in which a water-based well fluid is circulating in said well, comprising adding to said fluid a maximum of 1 g/l of a composition comprising at least one compound selected from the group consisting of partial esters of at least one polyol selected from the group consisting of glycerol and polyglycerols with at least one C8–C10 fatty acid, with the chain lengths of the acid and polyol parts being chosen such that said partial ester has sufficient dispersion in water, compatibility with any other ingredients, does not form an emulsion with the reservoir oil, and adsorbs sufficiently on the porous formation.

2. A method according to claim 1, wherein said polyglycerol has between 24 and 30% glycerol, between 28 and 34% diglycerol, between 20 and 26% triglycerol, between 9 and 15% tetraglycerol, and between 4 and 10% pentaglycerol.

3. A water-based well fluid for use in a method according to claim 1 comprising a maximum of 1 g/l of a composition comprising at least one compound selected from the group consisting of the partial esters of at least one polyol selected from the group consisting of glycerol and polyglycerols with at least one C8–C10 fatty acid, with the chain lengths of the acid and polyol parts being chosen such that said partial ester has sufficient dispersion in water, compatibility with any other ingredients, does not form an emulsion with the reservoir oil, and adsorbs sufficiently on the porous formation.

4. A fluid according to claim 3, wherein said polyglycerol has between 24 and 30% glycerol, between 28 and 34% diglycerol, between 20 and 26% triglycerol, between 9 and 15% tetraglycerol and between 4 and 10% pentaglycerol.

5. A method according to claim 2, wherein said polyglycerol has 27% glycerol, 31% diglycerol, 23% triglycerol, 12% tetraglycerol and 7% pentaglycerol.

6. A fluid according to claim 3 further comprising at least one ingredient selected from the group consisting of filtrate reducers, viscosifiers and heavy mineral suspensolds.

7. A fluid according to claim 3, wherein said poyglycerol has 27% glycerol, 31% diglycerol, 23% triglycerol, 12% tetraglycerol and 7% pentaglycerol.

\* \* \* \* \*